US006269586B1

(12) United States Patent
Jones

(10) Patent No.: US 6,269,586 B1
(45) Date of Patent: Aug. 7, 2001

(54) BAITS WITH ELECTROLYTE MIXTURES

(75) Inventor: Keith Jones, Spirit Lake, IA (US)

(73) Assignee: Pure Fishing, Inc., Spirit Lake, IA (US)

( * ) Notice: Subject to any disclaimer, the term of this patent is extended or adjusted under 35 U.S.C. 154(b) by 0 days.

(21) Appl. No.: 09/315,939

(22) Filed: May 21, 1999

(51) Int. Cl.[7] ................................................. A01K 85/00
(52) U.S. Cl. .................................................. 43/42.06
(58) Field of Search ................................ 43/42.06, 42.53

(56) References Cited

U.S. PATENT DOCUMENTS

| | | | |
|---|---|---|---|
| 2,563,522 | 8/1951 | Fisher | 43/42.24 |
| 2,874,048 | 2/1959 | Walldov | 99/3 |
| 3,108,389 | 10/1963 | McGuire | 43/42.06 |
| 3,505,755 | 4/1970 | Pearce | 43/42.06 |
| 3,579,895 | 5/1971 | Orn | 43/17.6 |
| 3,846,931 | 11/1974 | Block et al. | 43/42.53 |
| 3,854,234 | 12/1974 | Hardin | 43/42.06 |
| 4,050,181 | 9/1977 | Young et al. | 43/42.06 |
| 4,245,420 | 1/1981 | Carr | 43/42.06 |
| 4,530,179 | 7/1985 | Larew | 43/42.06 |
| 4,901,466 | * 2/1990 | Davis | 43/4.5 |
| 4,927,643 | * 5/1990 | D"orazio et al. | 426/1 |
| 4,993,183 | * 2/1991 | Carver | 43/42.06 |
| 5,276,993 | 1/1994 | Rosenblatt | 43/42.06 |
| 5,333,405 | 8/1994 | Bowles | 43/42.06 |
| 5,664,362 | 9/1997 | Caprio et al. | 43/42.06 |
| 5,664,363 | * 9/1997 | Keenan | 43/42.06 |
| 5,850,707 | * 12/1998 | Fell et al. | 43/131 |

OTHER PUBLICATIONS

The In–Fisherman, *A Renaissance In Soft Plastics For Bass* by Steve Quinn, Feb. 24, 1999.
CRC Press, Inc., *Low Calorie and Special Dietary Foods* by Basant K. Dwivedi, (1978).
Chemistry & Industry News, *A Spoonful of Sodium*, SCI (1996).
Tech Bulletins, *Good–Tasting Salty Flavors* Food Explorer Product Development (Feb. 24, 1999).

* cited by examiner

*Primary Examiner*—Charles T. Jordan
*Assistant Examiner*—Aileen J. Baker
(74) *Attorney, Agent, or Firm*—Roylance,Abrams,Berdo & Goodman, L.L.P.

(57) ABSTRACT

A gustatory stimulant component is described that can be molded into soft-bodied lures or mixed into doughbaits, gels, pastes, or viscous liquids. The stimulant contains a mixture of electrolytes that simulate or mimic the electrolytes in natural prey for enhancing the retention time of the bait within the fish mouth.

14 Claims, No Drawings

BAITS WITH ELECTROLYTE MIXTURES

FIELD OF THE INVENTION

The invention relates to artificial fishing lures for predator fish that contain mixtures of electrolytes, cations and anions that simulate the electrolytes of natural prey.

BACKGROUND OF THE INVENTION

For centuries anglers have employed live or dead bait prey to enhance their catch rates of gamefish. By using live, dead, or sundry body parts of various prey species as bait, anglers have enticed gamefish to strike their presentations. There was little scientific investigation into the reasons behind the effectiveness of these natural food sources.

More recently, the industry has sought synthetic fish attractants to reduce the costs while increasing the effectiveness and storage stability of the baits. Fish attractants have come in many different forms. Early attractants were designed as dipping solutions that adhered to the outer surface of an artificial lure. Later, the art evolved toward the use of a stimulant that was molded into the lure body. Such molded compositions released the stimulant in a more controlled rate and exhibited both higher efficacy for longer periods with better ease of use.

The use of sodium chloride in soft plastic baits dates back to at least 1981. The rationale accepted by most anglers is that fish find salt appealing, like humans. The taste of sodium chloride, the reasoning goes, causes gamefish to retain salt-containing lures for longer period. This longer retention time should result in a higher probability of setting the hook with an overall increase in the catch rate (ratio of bites to recovered fish). See, Larew U.S. Pat. No. 4,530,179.

Standard, non-iodized table salt is the common component in salted baits. It is an inexpensive component, readily understood in terms of the human taste experience, and has generated some scientific evidence that some fish species are sensitive to sodium chloride. Nonetheless, there exists a need in the art for artificial gustatory stimulants for fishing lures with an even longer retention rate.

SUMMARY OF THE INVENTION

It is an objective of the present invention to provide a synthetic gustatory stimulant for gamefish that mimics the electrolyte system sensed at the time of a bite by the gamefish or other predator.

It is an objective of the present invention to provide a synthetic gustatory stimulant for fish that can be molded into a soft-bodied artificial lure or blended with a gel, paste, liquid, or kneadable doughbait.

It is a further objective to provide a method for making a soft-bodied artificial lure that contains a gustatory stimulant that causes freshwater and/or saltwater fish to hold the bait for an extended period of time.

In accordance with these and other objectives of the invention that will become apparent from the description herein, the gustatory stimulant of the invention is essentially free of naturally occurring prey animal fluids or tissues and includes:

(a) at least two cations selected from Periodic Table Group IA, IIA, and ammonium cations, and (b) at least two anions selected from the group consisting of chloride, phosphate, and sulfate.

Gustatory stimulants of the present invention represent a synthetic source of electrolytes that mimic natural prey but which are readily compatible with a wide range of curable polymers, liquids, gels, and doughbait formulations for presentation in a variety of styles. The electrolytes used in the present invention show a significantly higher bait retention time compared to sodium chloride. This additional time provides anglers with additional time to sense the bite and set the hook.

DETAILED DESCRIPTION

The gustatory stimulants of the present invention are based on a recognition that predator fish require a plurality of electrolytes in the form of mixtures of cations and anions that maintain the electrolyte reserves within the fish. Notably, all animals need not only the sodium and chloride ions found in common table salt, but a host of other electrolytes as well for proper functioning.

Animals constantly lose electrolytes through various secretions. Fish are no exception. For example, freshwater fish maintain an electrolyte concentration gradient of roughly 200-fold between their internal and external environments. Electrolytes are constantly lost through the urine, skin, and gills. Without an external source of electrolytes to constantly replenish those ions lost to the environment the fish will die.

Complex mixtures of electrolytes are used by fish to maintain proper osmoregulation, regulate blood and cell pH, maintain adequate buffering capacity, ensure proper nerve functioning, and the like. While sodium and chloride make up a significant portion of the total electrolytes, many more are equally essential for a healthy predator fish. A partial list of these electrolytes, together with the respective normal quantities found in several animal categories, are provided in Table 1.

TABLE I

Average Ion Content Levels (In mMoles/l) and Normal Ranges (In Parentheses)

| | $Na^+$ | $K^+$ | $Ca^{2+}$ | $Mg^{2+}$ | $Cl^-$ | $PO_4^{3-}$ | $SO_4^{2-}$ |
|---|---|---|---|---|---|---|---|
| Saltwater | 469.5 | 10.0 | 10.3 | 53.8 | 548.5 | — | 29.6 |
| | (459.0–480.0) | (9.8–10.1) | (10.0–10.9) | (52.5–54.5) | (538.0–670.0) | | (28.3–35.0) |
| Annelids | 473.0 | 11.9 | 11.2 | 50.3 | 546.8 | — | 26.3 |
| | (456.0–483.0) | (10.5–14.0) | (10.1–11.2) | (44.0–53.6) | (538.0–557.0) | | (26.0–26.5) |
| Molluscs | 457.9 | 15.6 | 10.7 | 55.5 | 529.4 | 13.0 | 20.9 |
| | (180.0–482.0) | (11.4–179.0) | (9.0–65.0) | (52.0–65.0) | (109.0–583.5) | (12.0–14.0) | (6.2–28.9) |
| Crustaceans | 480.4 | 11.6 | 15.6 | 27.4 | 517.7 | — | 14.2 |
| | (442.0–566.0) | (9.5–13.3) | (8.6–34.9) | (6.8–46.0) | (420.0–629.0) | | (4.0–19.7) |
| Fish | 187.9 | 5.5 | 3.5 | 2.7 | 173.2 | 1.8 | 2.1 |
| | (142.0–215.0) | (2.0–9.8) | (2.5–5.8) | (1.5–4.0) | (147.0–190.0) | (1.3–2.3) | (0.5–3.1) |

TABLE I-continued

Average Ion Content Levels (In mMoles/l) and Normal Ranges (In Parentheses)

| | $Na^+$ | $K^+$ | $Ca^{2+}$ | $Mg^{2+}$ | $Cl^-$ | $PO_4^{3-}$ | $SO_4^{2-}$ |
|---|---|---|---|---|---|---|---|
| Freshwater | 0.4 (0.2–6.1) | 0.03 (0.01–0.1) | 0.9 (0.2–5.0) | 0.1 (0.02–0.7) | 0.1 (0.03–13.4) | — | 0.1 (0.9–1.4) |
| Annelids | 58.5 (21.4–79.0) | 5.0 (3.7–8.4) | 3.2 (2.9–3.6) | 2.3 (0.2–5.0) | 52.8 (36.0–79.0) | — | — |
| Molluscs | 36.9 (15.0–63.0) | 1.9 (0.4–4.2) | 5.4 (3.8–7.8) | 4.7 (0.2–9.8) | 30.8 (7.3–72.0) | — | — |
| Crustaceans | 184.6 (74.0–278.0) | 5.3 (3.9–8.4) | 12.1 (6.3–19.6) | 3.0 (1.7–4.3) | 210.3 (124.0–260.0) | — | 1.0 (0.8–1.2) |
| Fish | 142.2 (128.0–162.9) | 3.7 (2.3–5.9) | 2.8 (2.1–3.6) | 1.7 (1.2–2.2) | 120.4 (105.0–149.0) | 3.4 (0.04–8.7) | 1.4 (0.5–2.3) |
| Amphibians | 106.0 (101.0–112.9) | 5.1 (2.0–5.1) | 2.0 (1.5–2.5) | 1.0 (0.5–2.5) | 80.4 (78.0–81.3) | — | — |
| Terrestrial | | | | | | | |
| Insects | 98.0 (11.0–215.0) | 11.5 (4.9–19.1) | 9.3 (2.4–18.0) | 14.8 (0.8–39.0) | 78.1 (19.0–144.0) | 8.6 (0.1–39.0) | — |
| Birds/Reptiles | 147.8 (121.0–169.0) | 4.2 (2.6–7.9) | 3.3 (0.7–7.3) | 1.8 (0.5–2.9) | 113.2 (75.0–151.0) | — | — |
| Mammals | 146.6 (138.0–153.0) | 5.2 (4.4–6.0) | 3.6 (2.5–5.3) | 1.7 (1.2–2.0) | 108.5 (102.0–120.0) | — | — |

For predatory fish—especially freshwater species such as bass, walleye, trout, and pike—a significant portion of their electrolyte intake must be through dietary sources. By consuming prey species (e.g., crayfish, minnows, etc.), and hence the ions provided therein, a predator fish is able to bolster its proper reserves of electrolytes. Thus, each meal effectively recharges the predator's electrolyte system.

Table 2 shows the electrolyte contents found in several common prey organisms that often serve as bait for gamefish.

TABLE 2

Ion content (mg/L) of representative bait organisms

| Bait | $Na^+$ | $K^+$ | $Ca^{2+}$ | $Mg^{2+}$ | $Cl^-$ | $PO_4^{3-}$ | $SO_4^{2-}$ |
|---|---|---|---|---|---|---|---|
| Bloodworm | 11,104 | 547 | 521 | 1,070 | 19,320 | 4,815 | 2,497 |
| Squid | 10,070 | 845 | 433 | 1,305 | 19,498 | 1,515 | 782 |
| Crab/shrimp | 11,311 | 468 | 785 | 659 | 18,868 | 2,963 | 1,537 |
| Saltwater baitfish | 11,104 | 547 | 521 | 1,070 | 19,320 | 4,815 | 2,497 |
| Nightcrawler | 1,062 | 156 | 116 | 56 | 1,702 | 285 | 144 |
| Crayfish | 5,219 | 196 | 786 | 75 | 7,834 | 160 | 94 |
| Freshwater baitfish | 3,271 | 160 | 111 | 53 | 4,195 | 331 | 49 |
| Frog | 2,364 | 186 | 80 | 24 | 2,786 | 111 | 58 |
| Cricket | 3,701 | 309 | 160 | 136 | 5,105 | 370 | 96 |

The present invention demonstrates how the attractiveness of a wide assortment of artificial lures can also be enhanced by incorporating various mixtures of anions and cations that collectively simulate electrolyte mixtures found in natural prey in the essential absence of other bodily fluids and tissues of these prey that would adversely affect storage and manufacture of artificial baits or gustatory stimulants.

The electrolytes used in the present invention are selected from a group of electrolytes whose ratios can be readily adjusted to replicate a variety of different prey. Preferably, the synthetic gustatory stimulants of the present invention are palatable, taste-inducing electrolytes for gamefish that include: (a) at least two cations selected from Group IA, IIA, and ammonium cations, preferably at least two of sodium, potassium, calcium, magnesium, or ammonium; and (b) at least two anions selected from the group consisting of chloride, phosphate, and sulfate, in an overall concentration and in relative proportions sufficient to stimulate a gustatory response in a fish. Preferably, at least three of the cations and at least two of the anions are used in the gustatory stimulant. Even more preferably, four cations and three anions are used. Lithium cations are generally avoided due to adverse responses from catfish studies.

The cations and anions for use with the present invention are preferably selected from readily available, water soluble or insoluble sources that are environmentally benign, not hazardous to humans, and which are not degraded during the elevated temperatures associated with conventional processing. Exemplary sources of cations and anions used in the gustatory stimulant component of the invention include: sodium chloride, potassium chloride, calcium chloride, ammonium chloride, magnesium chloride, sodium sulfate, potassium sulfate, calcium sulfate, magnesium sulfate, monobasic and dibasic alkali metal (sodium or potassium) and alkaline earth metal (calcium or magnesium) phosphate, monobasic and dibasic sodium phosphate, as well as organic salts that provide the requisite cations or anions (e.g., inosine monophosphate disodium salt (also known as disodium inosinate) and betaine hydrochloride).

Preferably, the gustatory stimulants of the present invention are formed from synthetic sources of the various electrolytes so as to avoid inclusion of bodily tissues from natural prey sources that would interfere with processing, storage, or effectiveness. It is, however, within the scope of the invention to augment pastes or ground sources of natural prey with heightened levels of electrolyte mixtures according to the invention so that the paste has a level of gustatory electrolytes that is higher than the naturally occurring level of the prey from which the paste was originally formed. Alternatively, waste fish tissues can be ground, filtered of solids, and optionally concentrated, pasteurized, and/or fractionated to produce a gustatory stimulant according to the invention.

Overall, fluid electrolyte levels for most animals fall somewhere within the concentration ranges (in mmoles per liter) of Table 3. The gustatory stimulant of the invention preferably exhibits electrolytes from Table 3 with a concentration within the stated ranges.

TABLE 3

| Cation/Anion | Concentration (mmol/l) |
|---|---|
| Sodium | 15–570 |
| Potassium | 0.4–180 |
| Calcium | 0.5–65 |
| Magnesium | 0.2–65 |
| Chloride | 7–630 |
| Phosphate | 0.04–40 |
| Sulfate | 0.5–35 |

Table 4 shows preferred examples of salt recipes that can be used to simulate the salt contents found in three popular bait organisms. The use of these salt recipes yields electrolyte concentrations that not only closely resemble the ion content for each of the identified species but also fall within the natural concentration ranges stated above.

TABLE 4

| Electrolyte | Freshwater baitfish | Crayfish | Squid |
|---|---|---|---|
| NaCl | 6,900 | 11,200 | 23,900 |
| KCl | 170 | 260 | 1,000 |
| $CaCl_2$ | 300 | 2,200 | 1,200 |
| $MgCl_2$ | 200 | 300 | 5,000 |
| $Na_2SO_4$ | 75 | 140 | 1,150 |
| $KH_2PO_4$ | 250 | 200 | 1,100 |
| $Na_2HPO_4$ | 220 | 20 | 1,100 |
| IMPdiNa* | 50 | 50 | 100 |

*inosine monophosphate disodium salt

Electrolyte mixtures according to the invention are preferably dispersed or dissolved within a carrier suitable for use as a fishing bait composition. Suitable carriers include curable or cured polymers, water soluble polymers, polysaccharides, viscous gels, water-based carrier liquids, and the like. Preferably, the gustatory stimulant of the invention is combined with vinyl plastisol or another curable polymer and molded into soft bodied artificial lures, blended with kneadable doughbaits such as those described in Prochnow U.S. Pat. No. 5,089,277 (water soluble cellulose ether and polyalkylene glycol), impregnated into porous sponges, hydrogels or hydroxylated polyvinylacetate polymers, mixed into surface-applied attractants in the form of gels (see, Prochnow et al. U.S. Pat. No. 5,827,551), sprays, or viscous fluids. Preferably, solid forms of the electrolytes are added directly to the materials used to make the bait, i.e., in the form of a curable plastisol or to kneadable dough that exhibits a controlled solubility for gradual release of the gustatory stimulant.

Artificial, soft-bodied fishing lures that contain the synthetic gustatory stimulant of the invention are preferably made by mixing the gustatory stimulant with a curable polymer, molding the mixture into a shape suggestive of a natural prey for fish, and curing the molded lure. The molding and curing conditions will generally follow conventional conditions that depend on the nature of the polymer and whose particular conditions are readily determinable by those with no more than the existing level of skill in the art.

The electrolyte components of the present invention can be varied in proportion and ratio to simulate or mimic a variety of freshwater and saltwater prey. Table 5 illustrates highly preferred sources and concentrations for each (mg/l) that can be molded into soft bodied artificial lures according to the invention for saltwater and freshwater fishing.

TABLE 5

| | Freshwater baitfish | | Crayfish | | Squid | |
|---|---|---|---|---|---|---|
| Electrolyte | Preferred | Most Pref. | Preferred | Most Pref. | Preferred | Most Pref. |
| NaCl | 6000–8000 | 6,900 | 10500–12000 | 11,200 | 23000–25000 | 23,900 |
| KCl | 100–250 | 170 | 200–300 | 260 | 500–1500 | 1,000 |
| $CaCl_2$ | 200–400 | 300 | 2000–2400 | 2,200 | 800–1600 | 1,200 |
| $MgCl_2$ | 100–300 | 200 | 100–400 | 300 | 4000–6000 | 5,000 |
| $Na_2SO_4$ | 50–100 | 75 | 100–200 | 140 | 750–1500 | 1,150 |
| $KH_2PO_4$ | 200–300 | 250 | 100–300 | 200 | 750–1500 | 1,100 |
| $Na_2HPO_4$ | 175–275 | 220 | 1–50 | 20 | 750–1500 | 1,100 |
| IMPdiNa* | 1–150 | 50 | 1–150 | 50 | 1–150 | 100 |

*inosine monophosphate disodium salt

Table 6 identifies other types of freshwater and saltwater prey with the preferred and most preferred (parentheses) concentrations of cations and anions of the invention in moles/liter.

TABLE 6

| | $Na^+$ | $K^+$ | $Ca^{2+}$ | $Mg^{2+}$ | $Cl^-$ | $PO_4^{3-}$ | $SO_4^{2-}$ |
|---|---|---|---|---|---|---|---|
| Saltwater | 450–500 | 8–12 | 9–11 | 50–56 | 530–560 | — | 29.6 |
| (general lure) | (460–480) | (9–11) | (9.5–10.5) | (52–55) | (535–550) | | (28.3–35.0) |
| Annelids | 450–490 | 10–14 | 9.5–12 | 42–60 | 530–570 | — | 24–28 |
| | (455–475) | (11–13) | (10–11.5) | (44–56) | (540–560) | | (25–27) |
| Molluscs | 100–600 | 4–200 | 6–70 | 50–70 | 100–600 | 10–20 | 2–40 |
| | (300–500) | (5–25) | (9–25) | (52–65) | (350–525) | (12–16) | (20–35) |
| Crustaceans | 420–650 | 5–20 | 6–50 | 4–60 | 400–800 | — | 2–30 |
| | (460–600) | (8–14) | (20–40) | (6–20) | (500–625) | | (4–15) |
| Fish | 140–250 | 2–12 | 2–8 | 1–6 | 140–210 | 1–3 | 0.1–4 |
| | (160–235) | (4–10) | (3–6) | (2–4) | (150–200) | (1.8–2.5) | (1–3) |
| Freshwater | 0.1–7 | 0.01–0.9 | 0.2–5 | 0.02–1 | 0.03–14 | — | 0.9–4 |

TABLE 6-continued

| | $Na^+$ | $K^+$ | $Ca^{2+}$ | $Mg^{2+}$ | $Cl^-$ | $PO_4^{3-}$ | $SO_4^{2-}$ |
|---|---|---|---|---|---|---|---|
| (general lure) | (0.2–1.2) | (0.02–0.1) | (0.4–3) | (0.05–0.8) | (0.1–7) | | (0.9–1.4) |
| Annelids | 10–90 | 3–10 | 2–6 | 0.1–9 | 30–90 | — | — |
| | (20–80) | (4–8) | (3–5.2) | (0.25–7) | (35–75) | | |
| Molluscs | 5–80 | 0.2–6 | 2–9 | 0.1–12 | 2–100 | — | — |
| | (13–65) | (0.4–4.2) | (3.8–7.8) | (0.2–9.8) | (7.3–72) | | |
| Crustaceans | 50–325 | 1–15 | 1–30 | 1–10 | 1–350 | — | 0.1–2 |
| | (74–278) | (3.9–8.4) | (6.3–19.6) | (1.7–4.3) | (124–260) | | (0.8–1.2) |
| Fish | 100–200 | 1–10 | 1–8 | 0.5–5 | 50–200 | 0.01–20 | 0.1–8 |
| | (128—162.9) | (2.3–5.9) | (2.1–3.6) | (1.2–2.2) | (105–149) | (0.04–8.7) | (0.5–2.3) |
| Amphibians | 50–150 | 1–10 | 0.5–5 | 0.1–5 | 25–125 | — | — |
| | (101–112.9) | (2–5.1) | (1.5–2.5) | (0.5–2.5) | (78–81.3) | | |
| Terrestrial Prey | | | | | | | |
| Insects | 5–300 | 1–50 | 1–40 | 0.1–75 | 5–200 | 0.1–100 | — |
| | (11–215) | (4.9–19.1) | (2.4–18) | (0.8–39) | (19–144) | (0.1–39) | |
| Birds/Reptiles | 75–200 | 1–10 | 0.1–10 | 0.1–8 | 25–200 | — | — |
| | (121–169) | (2.6–7.9) | (0.7–7.3) | (0.5–2.9) | (75–151) | | |
| Mammals | 75–225 | 1–15 | –15 | 0.5 . 5 | 75–200 | — | — |
| | (138–153) | (4.4–6) | (2.5–5.3) | (1.2–2) | (102–120) | | |

Table 7 shows preferred electrolyte concentrations to mimic the electrolyte concentrations in various types of natural prey often used as fishing lures for freshwater and saltwater.

TABLE 7

Electrolyte Concentrations (mg/L) of Baits

| | $Na^+$ | | $K^+$ | | $Ca^{2+}$ | | $Mg^{2+}$ | | $Cl^-$ | | $PO_4^{3-}$ | | $SO_4^{2-}$ | |
|---|---|---|---|---|---|---|---|---|---|---|---|---|---|---|
| | Useful | Pref | Useful | Pref | Useful | Pref | Useful | Pref | Useful | Pref | Useful | Pref | Useful | Pref |
| Bloodworm | 10,000 to 12,000 | 10,750 to 11,050 | 400–700 | 500–600 | 400–700 | 500–600 | 800–1200 | 950–1150 | 18,000 to 21,000 | 19,000 to 20,000 | 4600–5000 | 4775–4875 | 2300–2600 | 2450–2550 |
| Squid | 9000 to 12,000 | 10,000 to 11,000 | 650–1050 | 800–925 | 200–600 | 375–450 | 1200–1500 | 1275–1350 | 18,000 to 21,000 | 19,000 to 20,000 | 1000–1700 | 1,450–1600 | 600–1000 | 675–875 |
| Crab/shrimp | 10,000 to 13,000 | 11,000 to 12,000 | 300–600 | 400–400 | 600–900 | 700–800 | 500–800 | 600–700 | 17,000 to 20,000 | 18,000 to 19,000 | 2700 to 3100 | 2900 to 3000 | 1400 to 1700 | 1500 to 1600 |
| Saltwater baitfish | 10,000 to 13,000 | 11,000 to 12,000 | 400–700 | 500–600 | 400–700 | 500–600 | 800–1200 | 1000–1100 | 18,000 to 21,000 | 19,000 to 20,000 | 4600–5000 | 3800–4900 | 2300–2600 | 2450–2550 |
| Nightcrawler | 800–1200 | 1000–1100 | 50–300 | 100–200 | 20–300 | 75–175 | 10–100 | 30–80 | 1500–2000 | 1600–1800 | 100–400 | 200–325 | 10–300 | 100–200 |
| Crayfish | 4800–5400 | 5100–5300 | 50–300 | 125–259 | 600–900 | 700–825 | 10–175 | 50–125 | 7500–8200 | 7750–7900 | 25–225 | 100–200 | 25–200 | 75–150 |
| Freshwater baitfish | 3000–3500 | 3200–3300 | 25–350 | 100–225 | 25–350 | 100–200 | 10–150 | 25–75 | 3800–4400 | 4100–4250 | 250–500 | 300–400 | 10–100 | 25–75 |
| Frog | 2000–2800 | 2300–2400 | 50–350 | 100–225 | 25–175 | 50–100 | 5–75 | 15–50 | 2500–3000 | 2700–2800 | 50–225 | 100–175 | 10–100 | 35–75 |
| Cricket | 3400–4000 | 3600–3800 | 200–400 | 275–350 | 75–275 | 100–200 | 75–200 | 100–175 | 4700–5300 | 5000–5150 | 200–600 | 300–425 | 25–200 | 75–175 |

EXAMPLES

Example 1

Cotton pellets were soaked in a 3 wt % solution of sodium chloride and a 3 wt % mixture of salts (sodium chloride and a mix of other electrolytes) according to the invention. Both sets of gustatory stimulants were presented to largemouth bass under controlled conditions. An underwater observation port and stopwatch permitted measurement of the retention time for each lure.

The 3% sodium chloride solution averaged a retention time of about 4 seconds. The mixture of the present invention averaged a retain time of about 20 seconds.

Example 2

The test of example 1 was repeated, except that the sodium chloride concentration in the comparative solution was increased to 6 wt %. The concentration of the electrolyte mix of the invention was reduced to 2.5 wt %. The test bass retained cotton balls soaked in the electrolyte solution of the invention for a period of time that was 500% longer.

What is claimed is:

1. An artificial fishing lure comprising a cured polymer in the shape of a soft-bodied artificial fishing lure and having dispersed therein a gustatory stimulant essentially free of natural prey tissues and comprising:

(a) at least two cations selected from Group IA, IIA, and ammonium cations, and (b) at least two anions selected from the group consisting of chloride, phosphate, and sulfate.

2. A lure according to claim 1 wherein said gustatory stimulant contains cations of at least two of sodium, potassium, calcium, magnesium, or ammonium.

3. A lure according to claim 1 wherein said gustatory stimulant contains cations of at least three of sodium, potassium, calcium, magnesium, or ammonium.

4. A lure according to claim 1 wherein said gustatory stimulant contains ammonium cations.

5. A lure according to claim 1 wherein said gustatory stimulant contains chloride, phosphate, and sulfate anions.

6. A lure according to claim 1 wherein said gustatory stimulant contains anions of chloride, phosphate, and sulfate.

7. A lure according to claim 1 in the shape of a freshwater baitfish made from a polymer having dispersed therein a gustatory stimulant comprising:

| Component | Concentration (mg/l) |
|---|---|
| NaCl | 6000–8000 |
| KCl | 100–250 |
| CaCl$_2$ | 200–400 |
| MgCl$_2$ | 100–300 |
| Na$_2$SO$_4$ | 50–100 |
| KH$_2$PO$_4$ | 200–300 |
| Na$_2$HPO$_4$ | 175–275 |

8. A lure according to claim 1 in the shape of a crayfish made from a polymer having dispersed therein a gustatory stimulant comprising:

| Component | Concentration (mg/l) |
|---|---|
| NaCl | 10500–12000 |
| KCl | 200–300 |
| CaCl$_2$ | 2000–2400 |
| MgCl$_2$ | 100–400 |
| Na$_2$SO$_4$ | 100–200 |
| KH$_2$PO$_4$ | 100–300 |
| Na$_2$HPO$_4$ | 1–50 |

9. A lure according to claim 1 wherein said gustatory stimulant consists essentially of electrolytes with a concentration within the following ranges:

| Cation/Anion | Concentration (mmol/l) |
|---|---|
| Sodium | 15–570 |
| Potassium | 0.4–180 |
| Calcium | 0.5–65 |
| Magnesium | 0.2–65 |
| Chloride | 7–630 |
| Phosphate | 0.04–40 |
| Sulfate | 0.5–35 |

10. A lure according to claim 1 wherein said gustatory stimulant consists essentially of electrolytes within one of the following concentration ranges:

| Electrolyte | Range A (mg/l) | Range B (mg/l) | Range C (mg/l) |
|---|---|---|---|
| NaCl | 6000–8000 | 10500–12000 | 23000–25000 |
| KCl | 100–250 | 200–300 | 500–1500 |
| CaCl$_2$ | 200–400 | 2000–2400 | 800–1600 |
| MgCl$_2$ | 100–300 | 100–400 | 4000–6000 |
| Na$_2$SO$_4$ | 50–100 | 100–200 | 750–1500 |
| KH$_2$PO$_4$ | 200–300 | 100–300 | 750–1500 |
| Na$_2$HPO$_4$ | 175–275 | 1–50 | 750–1500 |
| IMPdiNa* | 1–150 | 1–150 | 1–150 |

*inosine monophosphate disodium salt

11. A lure according to claim 1 wherein said gustatory stimulant consists essentially of a mixture of electrolytes chosen to mimic a prey bait selected from the group consisting of the following:

| | Na$^+$ (m/l) | K$^+$ (m/l) | Ca$^{2+}$ (m/l) | Mg$^{2+}$ (m/l) | Cl$^-$ (m/l) | PO$_4^{3-}$ (m/l) | SO$_4^{2-}$ (m/l) |
|---|---|---|---|---|---|---|---|
| Saltwater | 450–500 | 8–12 | 9–11 | 50–56 | 530–560 | — | 29.6 |
| Annelids | 450–490 | 10–14 | 9.5–12 | 42–60 | 530–570 | — | 24–28 |
| Molluscs | 100–600 | 4–200 | 6–70 | 50–70 | 100–600 | 10–20 | 2–40 |
| Crustaceans | 420–650 | 5–20 | 6–50 | 4–60 | 400–800 | — | 2–30 |
| Fish | 140–250 | 2–12 | 2–8 | 1–6 | 140–210 | 1–3 | 0.1–4 |
| Freshwater | 0.1–7 | 0.01–0.9 | 0.2–5 | 0.02–1 | 0.03–14 | — | 0.9–4 |
| Annelids | 10–90 | 3–10 | 2–6 | 0.1–9 | 30–90 | — | — |
| Molluscs | 5–80 | 0.2–6 | 2–9 | 0.1–12 | 2–100 | — | — |
| Crustaceans | 50–325 | 1–15 | 1–30 | 1–10 | 1–350 | — | 0.1–2 |
| Fish | 100–200 | 1–10 | 1–8 | 0.5–5 | 50–200 | 0.01–20 | 0.1–8 |
| Amphibians | 50–150 | 1–10 | 0.5–5 | 0.1–5 | 25–125 | — | — |
| Terrestrial Prey | | | | | | | |
| Insects | 5–300 | 1–50 | 1–40 | 0.1–75 | 5–200 | 0.1–100 | — |
| Birds/Reptiles | 75–200 | 1–10 | 0.1–10 | 0.1–8 | 25–200 | — | — |
| Mammals | 75–225 | 1–15 | 1–15 | 0.5–5 | 75–200 | — | — |

12. A lure according to claim 1 wherein said polymer is a plastisol.

13. A lure according to claim 1 wherein said polymer is in the shape of a crayfish, minnow, bloodworm, squid, crab, shrimp, nightcrawler, frog, or cricket.

14. A lure according to claim 13 wherein said lure is in the shape of a crayfish, minnow, crab, shrimp, nightcrawler, or cricket.

* * * * *